US008412080B2

(12) United States Patent
Maeda et al.

(10) Patent No.: US 8,412,080 B2
(45) Date of Patent: Apr. 2, 2013

(54) DEVELOPING ROLLER MANUFACTURING METHOD, DEVELOPING ROLLER, DEVELOPING DEVICE, AND IMAGE FORMING APPARATUS

(75) Inventors: Masahiro Maeda, Matsumoto (JP); Yoichi Yamada, Shiojiri (JP); Yoshiyuki Kurebayashi, Shiojiri (JP); Daisuke Matsumoto, Matsumoto (JP); Masaru Kobashi, Matsumoto (JP); Takatomo Fukumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 761 days.

(21) Appl. No.: 12/620,693

(22) Filed: Nov. 18, 2009

(65) Prior Publication Data

US 2010/0150617 A1 Jun. 17, 2010

(30) Foreign Application Priority Data

Dec. 11, 2008 (JP) ................................ 2008-315584

(51) Int. Cl.
*G03G 15/08* (2006.01)
*B21D 53/00* (2006.01)
*B21K 1/02* (2006.01)
*B23P 17/00* (2006.01)

(52) U.S. Cl. ........................ 399/279; 399/286; 29/895.3

(58) Field of Classification Search .................. 399/279, 399/284, 286; 29/895.3
See application file for complete search history.

(56) References Cited

U.S. PATENT DOCUMENTS

2009/0114347 A1 * 5/2009 Gelli ............................ 156/446
2009/0290900 A1 * 11/2009 Maeda et al. ................. 399/103

FOREIGN PATENT DOCUMENTS

JP 05293580 A * 11/1993
JP 2001-066876 3/2001
JP 2007-047322 2/2007
JP 2007-121947 5/2007
JP 2007-212968 8/2007

* cited by examiner

*Primary Examiner* — David Gray
*Assistant Examiner* — Erika J Villaluna
(74) *Attorney, Agent, or Firm* — Workman Nydegger

(57) ABSTRACT

A method of manufacturing a developing roller, including: a first rolling process for forming a first inclined groove which is continuous in a helical shape, by rotating a first die having blades inclined with respect to an axial direction and a circumferential direction, and a non-bladed die, and feeding an unprocessed developing roller between the first die and the non-bladed die; and a second rolling process for forming a second inclined groove which is continuous in a helical shape and intersects with the first inclined groove, by rotating a second die having blades inclined with respect to an axial direction and a circumferential direction in the direction opposite to that of the first die, and the non-bladed die in the same direction opposite to that in the first rolling process, and feeding the developing roller between the second die and the non-bladed die.

8 Claims, 9 Drawing Sheets

DEVELOPING ROLLER MANUFACTURING METHOD, DEVELOPING ROLLER, DEVELOPING DEVICE, AND IMAGE FORMING APPARATUS

BACKGROUND

1. Technical Field

The present invention relates to a developing roller manufacturing method, a developing roller, a developing device, and an image forming apparatus.

2. Related Art

In an image forming apparatus using nonmagnetic monocomponent toner, an electric charge is given to toner on a developing roller by frictional electrification. In order to effectively generate the frictional electrification, in JP-A-2001-66876, there is disclosed a developing roller in which blast processing is carried out on the developing roller, so that a given surface roughness Rz is given to the surface of the developing roller, whereby toner can be effectively rubbed against the developing roller.

However, the recess portions formed by the blast processing are not uniform in size, depth, shape, or array. For this reason, there is a probability that toner entering a deep recess portion cannot be rolled, so that it cannot be effectively electrically charged. In this manner, there is a probability that filming will occur due to the unevenness of the concave-convex portions of the developing roller surface. Further, in the case where toner is not effectively electrically charged, there is also a problem that the toner leaks from the developing device, thereby being dispersed in an image forming apparatus, or there may be ground fogging of an image.

Therefore, in order to improve the electrical charging of toner, in JP-A-2007-121947, there is disclosed a developing roller in which grooves regularly arrayed in a lattice shape on the developing roller are formed by rolling working, and a manufacturing method thereof. It has been reported that the developing roller with such grooves has improved electrical charging compared to conventional developing rollers having an irregular surface state due to blast processing.

However, also in the developing roller disclosed in JP-A-2007-121947, there is a thinly colored filming. The filming grows in accordance with the repeat of printing, so that the surface of the developing roller appears to be gradually colored by the color of the toner. Therefore, it will be hereinafter referred to as "colored filming". If the extent of the colored filming becomes excessive, adequate electrical charging cannot be applied to the toner, and therefore the amount of scattered toner is increased, so that there will be ground fogging of an image.

The cause of the colored filming can be considered as follows. There are regions in which toner cannot sufficiently circulate on the inclined surfaces and the like of a convex portion surrounded by the lattice grooves formed by the rolling working, so that toner is retained in the regions. When the temperature of the developing roller surface is increased due to consecutive printing or the like, the retained toner is affected by the heat, so that the filming progresses gradually. In a case where the grooves are formed by the rolling working, there are many cases where a protrusion (hereinafter referred to as a "burr") is formed on the ridge line of the convex portion surrounded by the grooves. The toner is apt to be retained in the portions which are in the shade of the burr, and this causing the generation of the filming.

The toner remaining on the developing roller without being developed is usually removed by a supply roller and new toner is supplied. Consequently, the same toner does not continually stay at the same place. However, if a burr exists on the ridge line of the convex portion, as shown in FIGS. 12A and 12B, regardless of the rotation direction of the supply roller, the old toner cannot be completely removed. For this reason, toner retention occurs in the proximity of the burr. As a result, the retained toner develops into the filming.

SUMMARY

An advantage of some aspects of the invention is that it provides a method of manufacturing a developing roller in which toner retention is prevented, a developing roller, a developing device, and an image forming apparatus.

According to a first aspect of the invention, there is provided a method of manufacturing a developing roller, including: a first rolling process for forming a first inclined groove which is continuous in a helical shape, by rotating a first die, which has blades inclined with respect to an axial direction and a circumferential direction, and a non-bladed die in the same direction, and feeding an unprocessed developing roller between the first die and the non-bladed die while rotating the developing roller in the direction opposite to the rotation direction of the first die and the non-bladed die and applying a working pressure to the developing roller; and a second rolling process for forming a second inclined groove which is continuous in a helical shape and intersects with the first inclined groove, by rotating a second die having blades inclined with respect to an axial direction and a circumferential direction in the direction opposite to that of the first die, and the non-bladed die in the same direction opposite to that in the first rolling process, and feeding the developing roller on which the first inclined groove has been formed, between the second die and the non-bladed die while rotating the developing roller in the direction opposite to that in the first rolling process and applying a working pressure to the developing roller. Therefore, the ridge lines of two sides which face any one side of the axial direction of the developing roller, among the four ridge lines of a quadrangle convex portion surrounded by the first inclined groove and the second inclined groove, may become the ridge lines on which a burr is formed.

Also, in the method according to the first aspect, a guide board is disposed below the first die or the second die and the non-bladed die. Therefore, the developing roller to be worked by rolling is supported at three points, so that it may be stably worked by rolling.

Also, in the method according to the first aspect, burrs are formed on the ridge lines of two sides which face any one side of the axial direction of the developing roller, in the quadrangle convex portion surrounded by the first inclined groove and the second inclined groove. Therefore, the flow of toner, which faces toward the two ridge lines on which the burrs have been formed, is formed, so that the retention of toner is prevented, thereby suppressing the occurrence of colored filming.

Also, in the method according to the first aspect, the developing roller is made of metal. Since the developing roller is made of metal, the first and second inclined grooves may be easily and reliably formed by the rolling working. Further, in a regulating method in which toner is transported mainly in the groove portions, by making the developing roller surface able to conduct electricity, an image force acts between the roller and the electrically charged toner in the groove, so that toner may be stably transported.

Also, in the method according to the first aspect, the pitches of the first inclined groove and the second inclined groove are set to an equal pitch and the intersecting angle of the first inclined groove and the second inclined groove is set to be 90°. Therefore, the quadrangle convex portion has a square shape, so that the length of the ridge line on which the burr is formed may be shortened.

Also, according to a second aspect of the invention, there is provided a developing roller having a first inclined groove and a second inclined groove, which are continuous in a helical shape inclined with respect to an axial direction and a circumferential direction and intersect with each other, formed in the surface thereof, wherein burrs are formed on the ridge lines of two sides which face any one side of the axial direction of the developing roller, in a quadrangle convex portion surrounded by the first inclined groove and the second inclined groove. Therefore, the flow of toner, which faces toward the two ridge lines on which the burrs have been formed, is generated in the developing roller, so that the retention of toner is prevented, thereby suppressing the occurrence of colored filming.

Also, in the developing roller according to the second aspect, toner is transported in the groove portions of the first inclined groove and the second inclined groove. Therefore, a constant amount of toner may be transported along the groove depth by a regulating method in which toner is transported mainly in the groove portion.

Also, in the developing roller according to the second aspect, the developing roller is made of metal. Therefore, the first and second inclined grooves can be formed with a definite contour and a constant depth, and at the same time, by making the developing roller surface able to conduct electricity, an image force acts on the electrically charged toner transported in the groove, so that toner may be stably transported.

Also, according to a third aspect of the invention, there is provided a developing device including: a supply roller which supplies toner; a developing roller to which toner is supplied from the supply roller; and a regulating blade which comes into contact with the developing roller, thereby regulating the total thickness of toner on the developing roller, wherein the developing roller according to the second aspect is used as the developing roller. Therefore, the retention of toner on the developing roller is prevented, so that the occurrence of colored filming may be suppressed.

Also, according to a fourth aspect of the invention, there is provided an image forming apparatus including: a latent image supporting body on which an electrostatic latent image is formed; a developing device which develops a toner image on the latent image supporting body by developing the electrostatic latent image using toner; and a transferring device which transfers the toner image on the latent image supporting body to a transfer medium, wherein the developing device is the developing device according to the third aspect. Therefore, the retention of toner on the developing roller is prevented, so that the occurrence of colored filming may be suppressed, whereby a high quality image of may be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
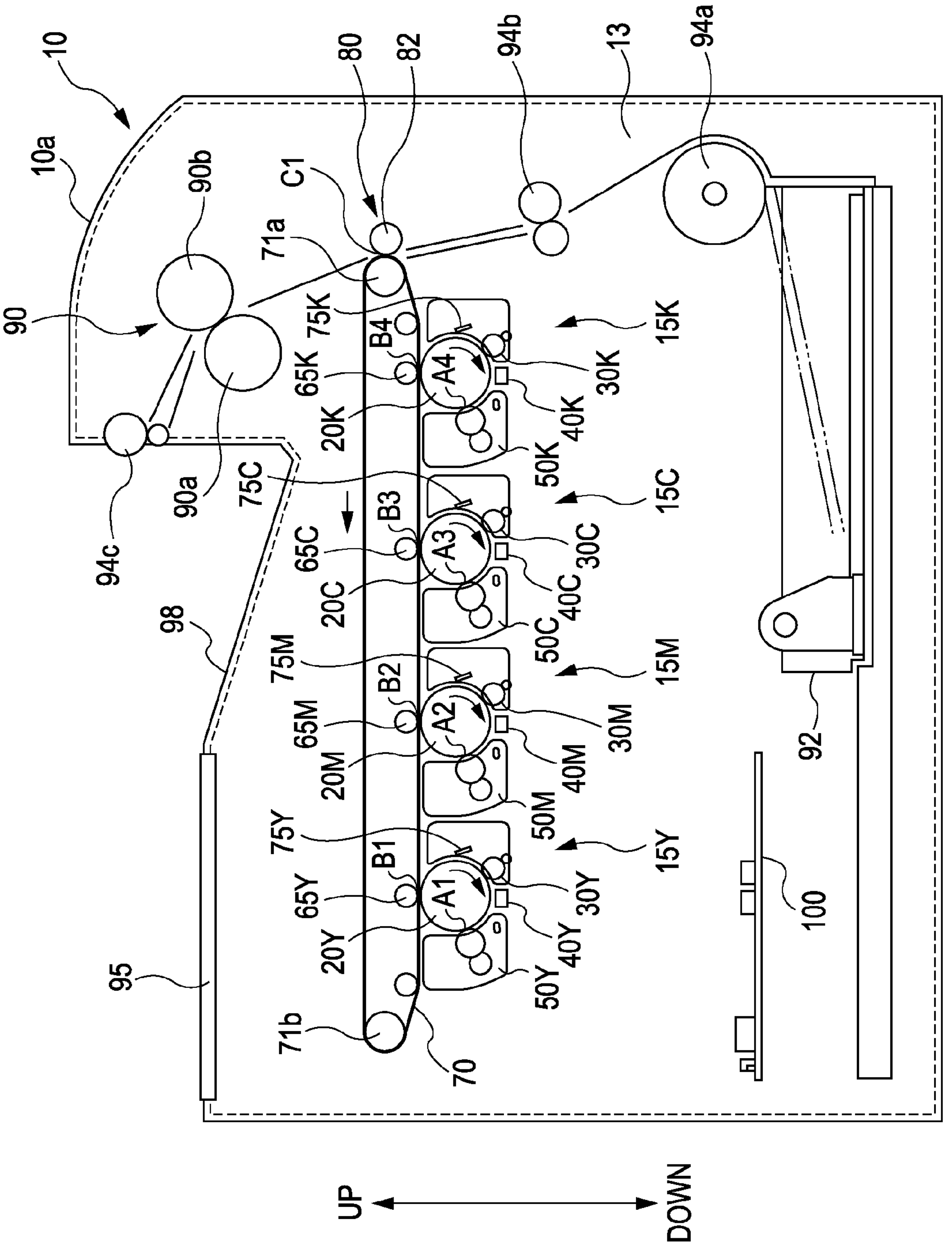
FIG. 1 is a diagram illustrating the overall structure of an image forming apparatus according to an embodiment of the invention.

Hereinafter, embodiments of the invention will be explained based on the drawings. FIG. 1 is a diagram schematically illustrating an image forming apparatus according to an embodiment of the invention.

As shown in FIG. 1, the image forming apparatus 10 includes four image forming stations 15Y, 15M, 15C, and 15K; an intermediate transferring belt 70; a secondary transferring unit 80; a fixing unit 90; a display unit 95 which is configured of a liquid crystal panel constituting a means of messaging to a user; and a control unit 100 which controls these units and the like and manages the operation of the image forming apparatus.

The image forming stations 15Y, 15M, 15C, and 15K respectively have functions for forming images by yellow (Y), magenta (M), cyan (C), and black (K) toner. Since the image forming stations 15Y, 15M, 15C, and 15K have the same configuration, only the image forming station 15Y is explained below.

As shown in FIG. 1, the image forming station 15Y has an electrical charging unit 30Y, an exposure unit 40Y, a developing unit 50Y, and a primary transferring unit along the rotation direction of a photo conductor 20Y used as one example of an image supporting body.

The photo conductor 20Y has a cylindrical substrate and a photosensitive layer formed on the outer circumferential surface of the substrate. The photo conductor 20Y can rotate about a central axis, and in this embodiment, rotates in a clockwise direction, as indicated by an arrow.

The electrical charging unit 30Y is a device for electrically charging the photo conductor 20Y. A latent image is formed on the electrically charged photo conductor 20Y by the irradiation of a laser from the exposure unit 40Y.

The exposure unit 40Y includes a semiconductor laser, a polygon mirror, a F-θ lens, and the like, and irradiates the electrically charged photo conductor 20Y with a modulated laser on the basis of the image signals input from a host computer (not shown) such as a personal computer, a word processor, or the like.

The developing unit 50Y is a device for developing the latent image on the photo conductor 20Y by using yellow toner (Y). The developing unit 50Y includes a developing roller 51Y and a supply roller 52Y, which are disposed in a developing chamber which is supplied with toner from a exchangeable toner cartridge, and a regulating blade 53Y comes into contact with the developing roller 51Y for creating a thin layer of toner on the developing roller 51Y.

The primary transferring unit transfers the yellow toner image formed on the photo conductor 20Y to the intermediate transferring belt 70 by the application of a primary transferring bias from a primary transferring roller 65Y in a primary transferring section B1. When the toners of four colors have been sequentially transferred in layers by the respective primary transferring sections B1, B2, B3, and B4, a full-color toner image is formed on the intermediate transferring belt 70.

The intermediate transferring belt 70 is an endless belt which is mounted to pass around a belt driving roller 71*a* and a driven roller 71*b*, and is rotationally driven while coming into contact with the photo conductors 20Y, 20M, 20C, and 20K.

The secondary transferring unit 80 is a device for transferring a monochromatic toner image or a full-color toner image formed on the intermediate transferring belt 70 to a transfer material such as paper, film, cloth, or the like.

The fixing unit 90 is a device constituted of a fixing roller 90*a* and a pressurizing roller 90*b*, and acts to fuse and bond the monochromatic toner image or the full-color toner image transferred to the transfer material, to the transfer material, thereby making the image a permanent image.

Next, the operation of the image forming apparatus 10 configured as described above will be explained. First, when image signals or control signals from a host computer (not shown) are inputted to a main controller of the image forming apparatus through an interface, the photo conductor 20Y, the developing roller 51Y provided in the developing unit 50Y, the intermediate transferring belt 70, and the like rotate due to the control of a unit controller on the basis of the commands from the main controller. The photo conductor 20Y is electrically charged in sequence by the electrical charging unit 30Y at an electrical charging position while being rotated.

When the electrically charged region of the photo conductor 20Y has reached an exposure position with the rotation of the photo conductor 20Y, a latent image according to the yellow Y image information is formed on the region by the exposure unit 40Y.

When the latent image formed on the photo conductor 20Y has reached a developing position with the rotation of the photo conductor 20Y, the image is developed by the developing unit 50Y. Thus, a toner image is formed on the photo conductor 20Y.

When the toner image formed on the photo conductor 20Y has reached the position of the primary transferring section B1 with the rotation of the photo conductor 20Y, the image is transferred to the intermediate transferring belt 70 by the primary transferring unit. At this time, in the primary transferring unit, a primary transferring voltage having the opposite polarity to the electrical charge polarity of toner is applied from the primary transferring roller 65Y. As a result, the toner images of four colors formed on the respective photo conductors 20Y, 20M, 20C, and 20K are transferred in layers to the intermediate transferring belt 70, so that the full-color toner image is formed on the intermediate transferring belt 70.

The intermediate transferring belt 70 is driven by the driving force from a belt driving means such as a motor, which is transmitted thereto through the belt driving roller 71*a*.

The full-color toner image formed on the intermediate transferring belt 70 is transferred to the transfer material such as paper by the secondary transferring unit 80. Such a transfer material is transported to the secondary transferring unit 80 from a paper feed tray through a paper feed roller 94*a* and a resist roller 94*b*.

The full-color toner image transferred to the transfer material is fused and bonded to the transfer material by the heating and the pressurizing by the fixing unit 90. Then, the transfer material passes through the fixing unit 90, and then is discharged by a paper discharging roller 94*c*.

On the other hand, after the photo conductors 20Y, 20M, 20C, and 20K have passed over the positions of the primary transferring sections B1, B2, B3, and B4, they are subjected to a process for removing electrical charge by a neutralization unit (not shown), thereby being prepared for the electrical charging in order to form the next latent image.

On the driven roller 71*b* side of the intermediate transferring belt 70 after the secondary transferring, there is provided an intermediate transferring belt cleaning device (not shown) used to clean the intermediate transferring belt 70 after the secondary transferring.

Figure 2A:
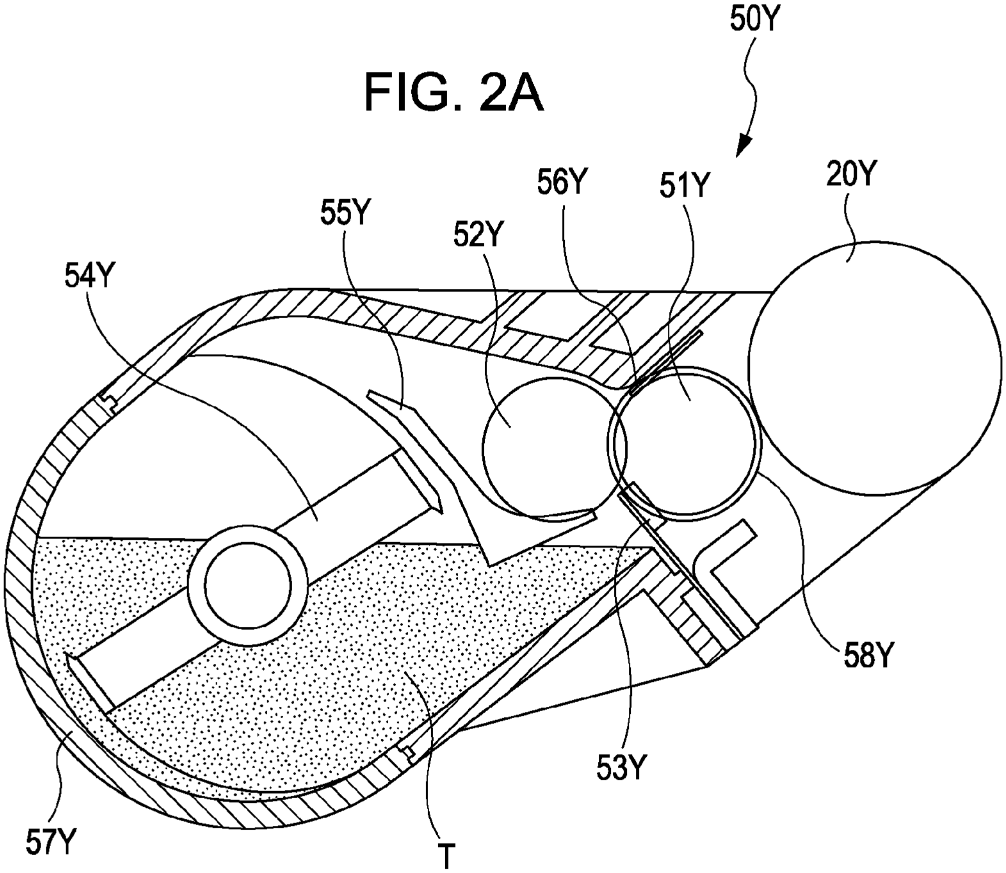
FIGS. 2A and 2B are diagrams illustrating a developing device according to an embodiment of the invention.
Figure 2B:
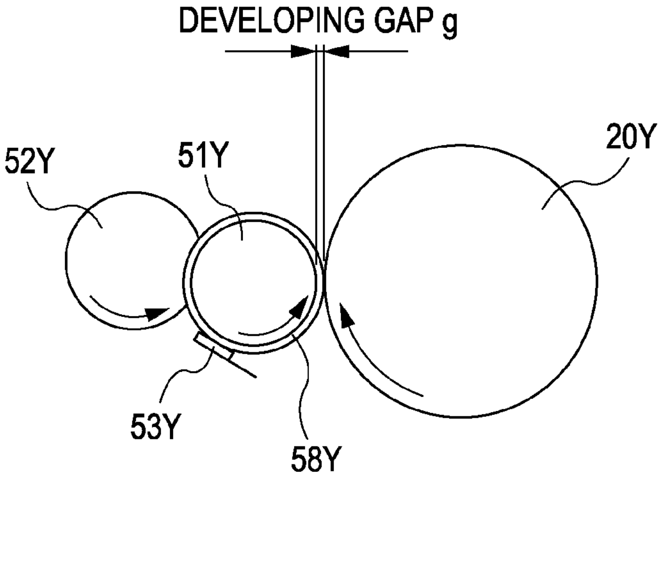

FIG. 2A is a schematic view showing one example of the developing unit 50Y according to the invention, and FIG. 2B is a view showing a part of the developing unit 50Y.

The developing unit 50Y includes the developing roller 51Y which transports the toner T to the photo conductor 20Y; the supply roller 52Y which comes into pressure-contact with the developing roller 51Y so as to supply the toner T; the regulating blade 53Y which comes into contact with the developing roller 51Y so as to regulate the toner T transported to the photo conductor 20Y; a toner agitating and transporting member 54Y which agitates and transports the toner T; a toner receiving member 55Y which receives the toner T transported by the toner agitating and transporting member 54Y and guides the toner T toward the supply roller 52Y; a seal member 56Y which comes into contact with the developing roller 51Y in a direction which recovers the remaining toner T after the development so as to prevent toner leakage; and a case 57Y which contains the toner T.

The developing roller 51Y is formed into a cylindrical shape from material able to conduct electricity such as metal or alloy including copper, aluminum, stainless steel, or the like. The supply roller 52Y is formed into a cylindrical shape from an elastic material such as foamed urethane rubber or silicone rubber, or formed by wrapping a cylindrical body with a hair-transplanted sheet. The developing roller 51Y and the supply roller 52Y rotate in contact with each other, whereby the toner T is supplied to the developing roller 51Y, so that the toner layer of a given thickness is formed on the developing roller 51Y. Due to the regulating blade 53Y which comes into contact with the developing roller 51Y supplied with the toner T, the total thickness of the toner T on the developing roller 51Y is regulated. An electric charge is given to the toner T on the developing roller 51Y by frictional electrification.

A spacer 58Y is fixed on each of the opposite ends of the developing roller 51Y. These spacers 58Y are brought into contact with the image non-supporting surfaces of the photo conductor 20Y, so that a developing gap g is formed between the toner transporting surface of the developing roller 51Y and the image supporting surface of the photo conductor 20Y, which faces the toner transporting surface.

Further, the developing gap g is adjusted to a desired size by appropriately selecting the thicknesses of the spacers 58Y. Therefore, this developing device performs nonmagnetic mono-component developer non-contact jumping development using the toner T which is nonmagnetic mono-component developer. In this case, in this embodiment, as shown in FIG. 2B, setting is made such that the photo conductor 20Y rotates in the clockwise direction and both the developing roller 51Y and the supply roller 52Y rotate in the counter-clockwise direction. Also, setting is made such that the circumferential velocity of the photo conductor 20Y and the circumferential velocities of the spacers 58Y on the developing roller 51Y are the same or approximately the same. Further, in this embodiment, a non-contact type developing method is explained, but a contact type developing method may also be used.

Figure 3:
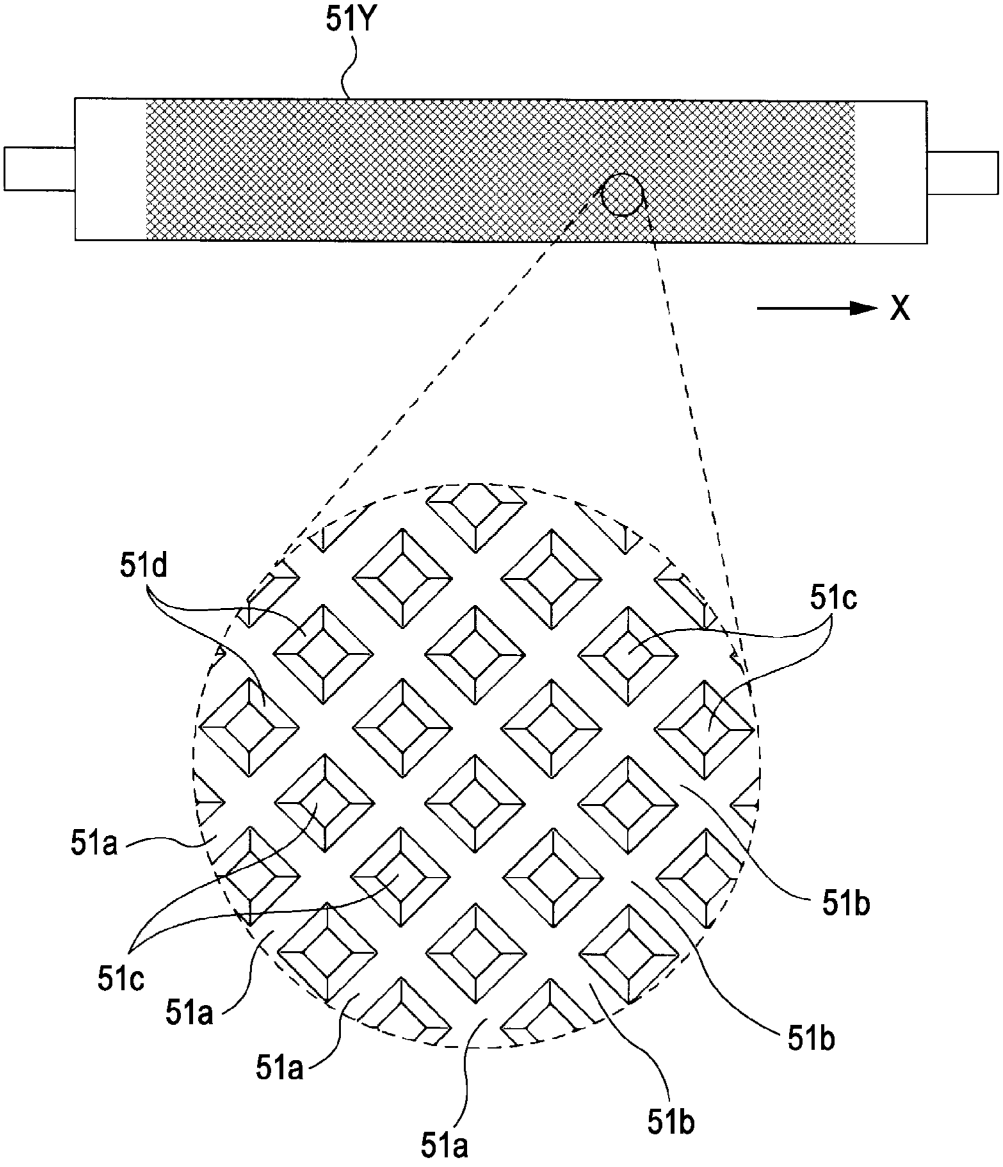
FIG. 3 is a diagram illustrating a developing roller according to an embodiment of the invention along with a partly enlarged view of the surface thereof.

FIG. 3 is a diagram showing one example of the developing roller according to the invention along with a partly enlarged view of the surface thereof, and the partly enlarged view (in the circle of a dotted line) of FIG. 3 is an enlarged view of the surface portion of the developing roller 51Y of this embodiment.

In order to improve the transportability and the electrical charging of the toner, a first inclined groove 51*a*, which is continuous in a helical shape inclined at a given angle with respect to an axial direction and a circumferential direction, and a second inclined groove 51*b*, which is continuous in a helical shape inclined with respect to the axial direction and the circumferential direction in the direction opposite to that of the first inclined groove 51*a*, are formed so as to cross each other in the surface of the developing roller 51Y. Further, quadrangle convex portions 51*c* having inclined flanks 51*d* are formed surrounded by the first inclined groove 51*a* and the second inclined groove 51*b*. In the developing roller 51Y according to the invention, a regulating method is adopted in which toner is transported mainly in the groove portions of the first and second inclined grooves 51*a* and 51*b* which are formed in the surface of the developing roller. Since the developing roller 51Y is formed of a material able to conduct electricity such as metal or alloy including copper, aluminum, stainless steel, or the like, an image force acts between the roller and the electrically charged toner transported in the grooves, so that toner is stably transported up to a developing nip. Further, if toner of a small grain diameter, where the volume average grain diameter is equal to or less than 5 μm, is used as the toner, the image of a higher quality can be obtained. Further, since toner of a small grain diameter is able to be highly electrically charged compared with toner of a larger grain diameter, such a toner is suitable for the regulating method in which toner is transported mainly in the grooves. Further, nickel plating, chrome plating, or the like may also be carried out on the surface of the developing roller 51Y, if necessary. Also, it is preferable to use toner with an average degree of circularity of 0.95~0.99, preferably 0.972~0.983. In this case, the electrification amount can be stable, and at the same time, transportability can also be excellent. As a method of adjusting the degree of circularity of toner, in an emulsion polymerization method, by controlling the temperature and the time in the cohesion process of secondary particles, the degree of circularity can be freely changed and made in the range of 0.94~1.00. In a suspension polymerization method, the preparation of the true-spherical toner is possible and the degree of circularity can be made in the range of 0.98~1.00. In order to achieve an average degree of circularity of 0.95~0.99, the degree of circularity can be appropriately adjusted by heating and deforming of toner at a temperature equal to or more than the Tg temperature of the toner.

Figure 4:
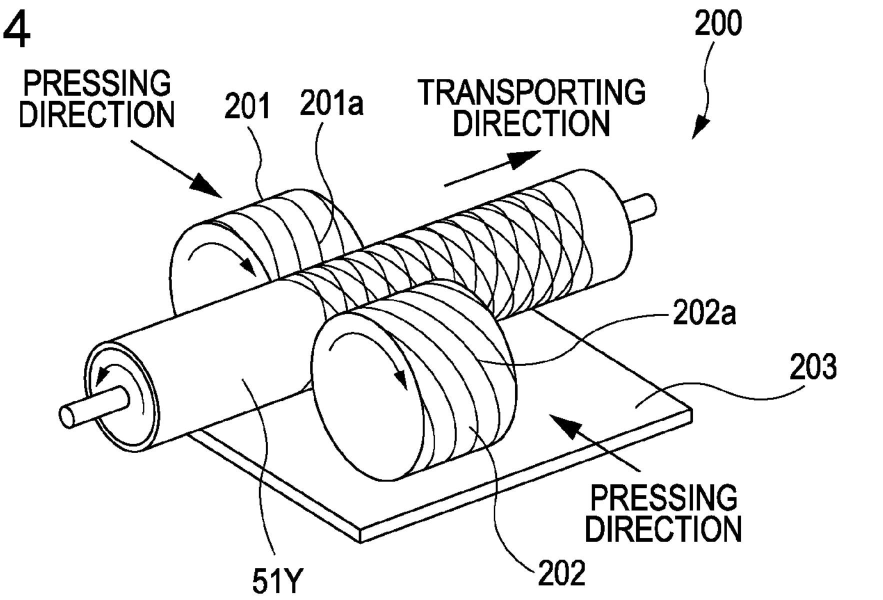
FIG. 4 is a diagram illustrating a conventional rolling working.

FIG. 4 is a diagram illustrating conventional rolling working for forming the first inclined groove 51*a* and the second inclined groove 51*b* in the surface of the developing roller 51Y.

A rolling apparatus 200 used in the rolling working includes a first die 201 which has first inclined blades 201*a* inclined with respect to an axial direction and a circumferential direction, for forming the first inclined groove 51*a* in the developing roller 51Y; a second die 202 which has second inclined blades 202*a* inclined with respect to an axial direction and a circumferential direction in the direction opposite to that of the first inclined blade 201*a*, for forming the second inclined groove 51*b* in the developing roller 51Y; and a guide board 203 disposed below the first die 201 and the second die 202.

The rolling apparatus 200 transports and works by rolling a work piece (here, an unprocessed developing roller 51Y) between the first die 201 and the second die 202, which are disposed at the positions facing each other on the guide board 203 and rotate in a clockwise direction, as indicated by an arrow. In the rolling working, a working pressure is given by pressing the first and second dies 201 and 202 against the work piece. The work piece is worked by rolling by rotating the work piece in the counter-clockwise direction opposite to the rotation direction of the first and second dies 201 and 202. The work piece may also be worked by rolling by rotating the first and second dies 201 and 202 in the counter-clockwise direction and rotating the work piece in the clockwise direction.

The first and second inclined blades 201*a* and 202*a* for forming the above-described first and second inclined grooves 51*a* and 51*b* are respectively provided in the first die 201 and the second die 202. The first and second inclined blades 201*a* and 202*a* form the first and second inclined grooves 51*a* and 51*b* intersecting with each other, and the convex portions 51*c* of a truncated four-sided pyramid shape having the inclined flanks 51*d*, in the surface of the work piece.

The convex portion 51*c* of a truncated four-sided pyramid shape has a square shape when the inclined angles of the first and second inclined grooves 51*a* and 51*b* are 45° and the pitches of them are set to be the same as each other, and a rhombic shape when the inclined angles of the first and second inclined grooves 51*a* and 51*b* are angles other than 45° and the pitches of them are set to be the same as each other. Also, the quadrangle convex portion 51*c* shows a rectangular shape when the inclined angles of the first and second inclined grooves 51*a* and 51*b* are 45° and the pitches of them are set to be different from each other, and a parallelogram shape when the inclined angles of the first and second inclined grooves 51*a* and 51*b* are angles other than 45° and the pitches of them are set to be different from each other. Since a burr 51*e* is formed on the ridge line of the quadrangle convex portion 51*c*, in order to make the length of the ridge line as short as possible, it is preferable that the shape of the convex portion 51*c* be a square shape. For this reason, the first inclined groove 51*a* and the second inclined groove 51*b* are arranged such that they have an equal pitch and an intersecting angle of 90°.

Although the first and second inclined blades 201*a* and 202*a* are explained as being the sites where the first and second dies 201 and 202 are brought into contact with the surface of the work piece, in the rolling working, the first and second inclined blades 201*a* and 202*a* do not positively cut the work piece, but act to form a depression by crushing the work piece by a suppressing force.

Also, in the rolling working, the first and second dies 201 and 202 are not brought into contact with the opposite ends of the work piece, so that smooth surfaces without concavity-convexity remain on the opposite ends. That is, the convex portions 51*c* which have not been brought into contact with the first and second dies 201 and 202 at the central portion of the developing roller 51Y, and the opposite ends, which do not become objects to be worked by the rolling working, are the non-processed surfaces.

Figure 12A:
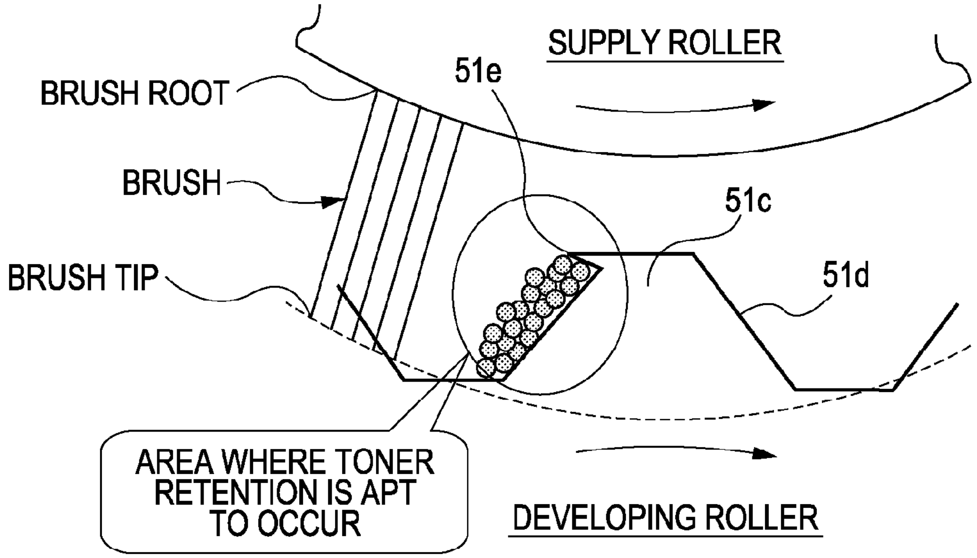
FIGS. 12A and 12B are diagrams illustrating the occurrence of toner retention due to the burr.
Figure 12B:
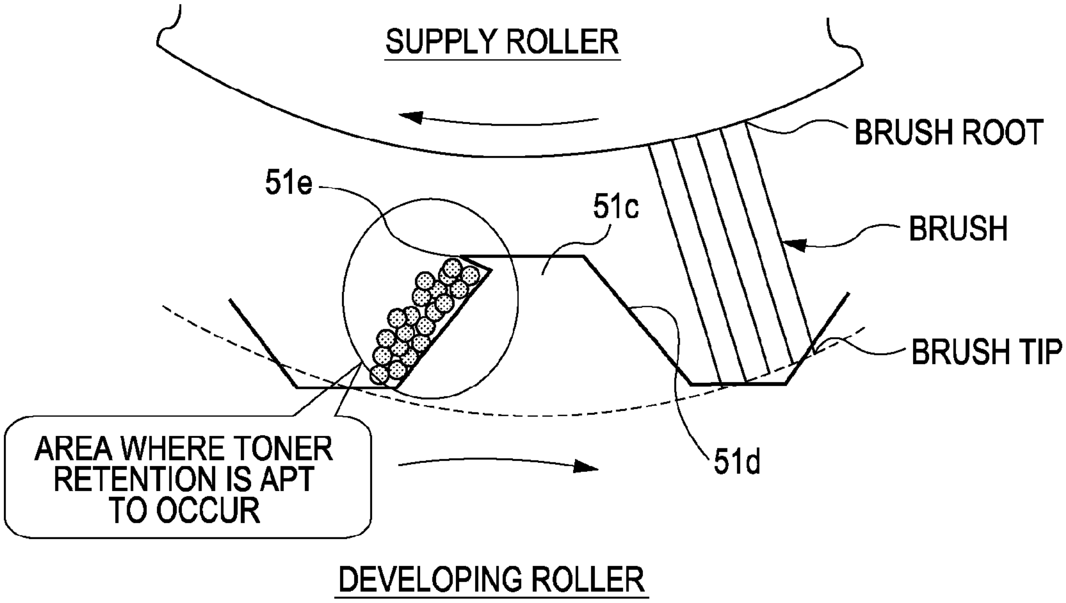

In this manner, even if the developing roller 51Y with regular grooves is used, there are regions in which toner cannot sufficiently circulate at the inclined flanks 51*d* and the like of the convex portion 51*c* of a truncated four-sided pyramid shape, which is surrounded by the first inclined groove 51*a* and the second inclined groove 51*b* of the developing roller 51Y. Therefore, toner stays in the portion, so that the above-described colored filming is generated. As regions in which toner does not sufficiently circulate, as shown in FIGS. 12A and 12B, there is the example of the inclined flank 51*d* of the convex portion 51*c*, which is located at the shade of the burr 51*e* formed in the process of the rolling working.

Figure 5:
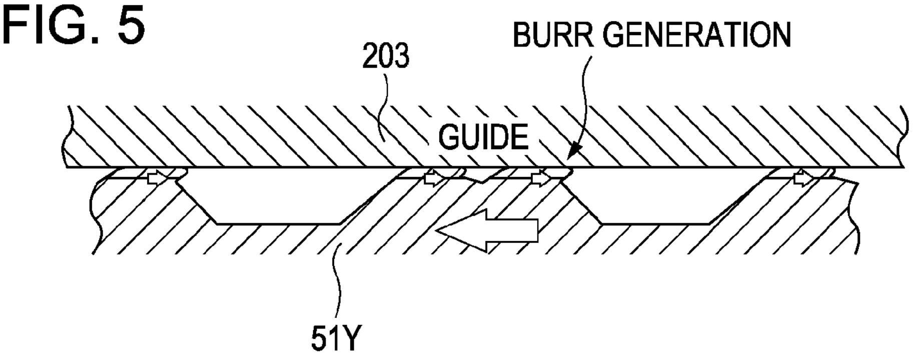
FIG. 5 is a diagram illustrating a burr generation mechanism.

In the rolling working, the first inclined blades 201*a* of the first die 201 and the second inclined blades 202*a* of the second die 202 do not positively cut the work piece, but act to form a depression by crushing the work piece by a suppressing force. Therefore, as shown in FIG. 5, embossed portions are formed on the ridge lines of the convex portion 51*c* of a truncated four-sided pyramid shape, which is surrounded by the first and second inclined grooves 51*a* and 51*b* formed after the rolling working. The embossed portions formed on the ridge lines of two sides which are located on the upstream side of the rotation direction (the rear side of the rotation direction) in the rolling working of the work piece are crushed by the guide board 203, so that there are formed the burrs 51*e* protruding from the ridge lines to the outside (from the ridge lines of the convex portion 51*c* to the groove portion side on the upstream side of the rotation direction in the rolling working of the work piece). Although the embossed portions are also formed on the ridge lines on the downstream side of the rotation direction (the front side of the rotation direction), the embossed portions on the downstream side are crushed on the upper surface of the convex portion 51*c*, so that they do not protrude outside the ridge lines.

Figure 6:
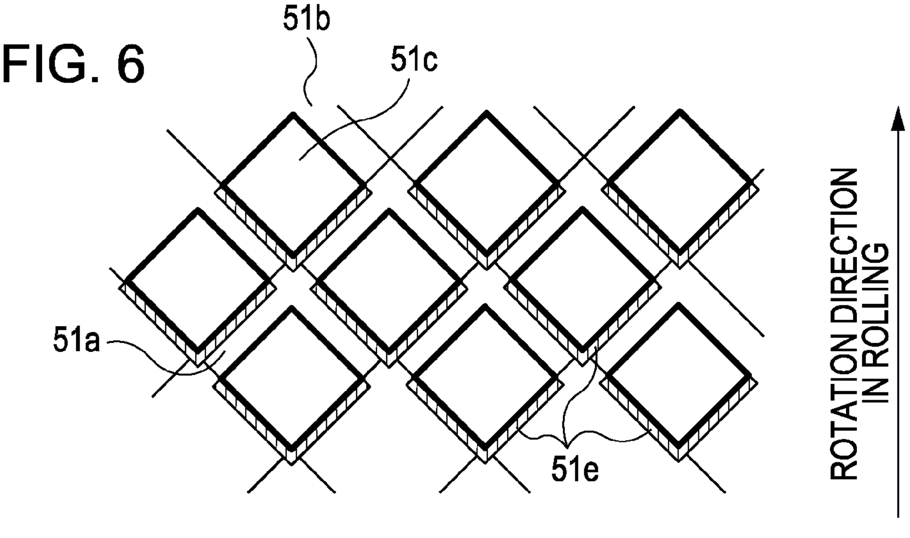
FIG. 6 is a diagram illustrating the positions of the burrs formed by the conventional rolling working.

FIG. 6 is a diagram showing the places where the burrs 51*e* are formed when the developing roller 51Y has been worked by rolling by the rolling working shown in FIG. 4.

As shown in FIG. 6, the burrs 51*e* are formed on the ridge lines of two sides of the respective convex portions 51*c* of a truncated four-sided pyramid shape, which are surrounded by the first inclined groove 51*a* and the second inclined groove 51*b*. The ridge lines of two sides, on which the burr 51*e* has been formed, respectively face one side (right side) and the other side (left side) of the axial direction of the developing roller 51Y. In the rolling apparatus 200 shown in FIG. 4, if the rolling working is carried out in a state in which the rotation direction of the first and second dies 201 and 202 are the counter-clockwise direction and the rotation direction of the work piece is the clockwise direction, the ridge lines of two sides, on which the burr 51*e* is formed, are changed. In the rolling working to form the inclined grooves in the work piece, in the case where the first inclined groove 51*a* and the second inclined groove 51*b* are simultaneously formed, the ridge lines of two sides, on which the burr 51*e* is formed, are respectively formed to face one side (right side) and the other side (left side) of the axial direction of the developing roller 51Y.

The burr 51*e* leads to the generation of toner retention, thereby causing the colored filming. As the result of experiment, it has been found that in order to circulate toner remaining on the inclined flank 51*d* of the convex portion 51*c*, which is in the shade portion of the burr 51*e*, it is effective to form a flow of toner in the axial direction, which faces the ridge lines on which the burrs 51*e* have been formed, on the developing roller 51Y. For this reason, the inventors have devised a developing roller manufacturing method which forms the ridge lines, on which the burr 51*e* is formed, on two sides of the quadrangle convex portion 51*c*, which face any one side of the axial direction of the developing roller 51Y.

Figure 7A:
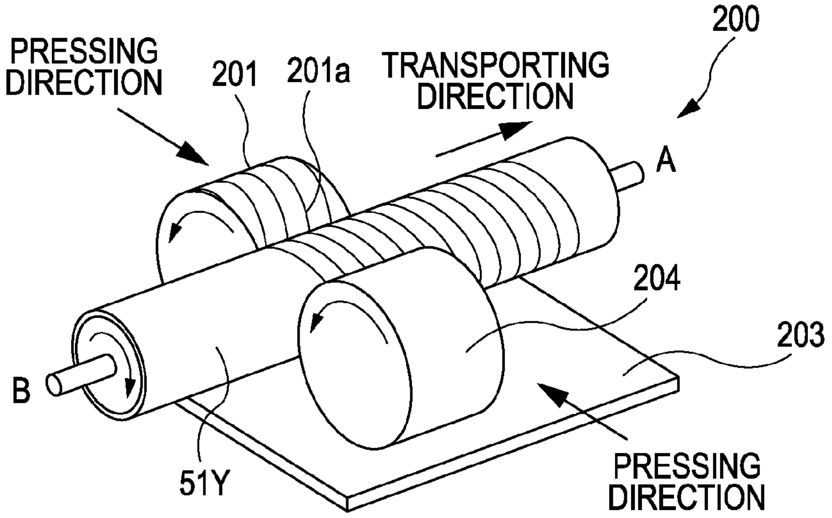
FIGS. 7A and 7B are diagrams illustrating the rolling working process of a developing roller according to a first embodiment of the invention.
Figure 7B:
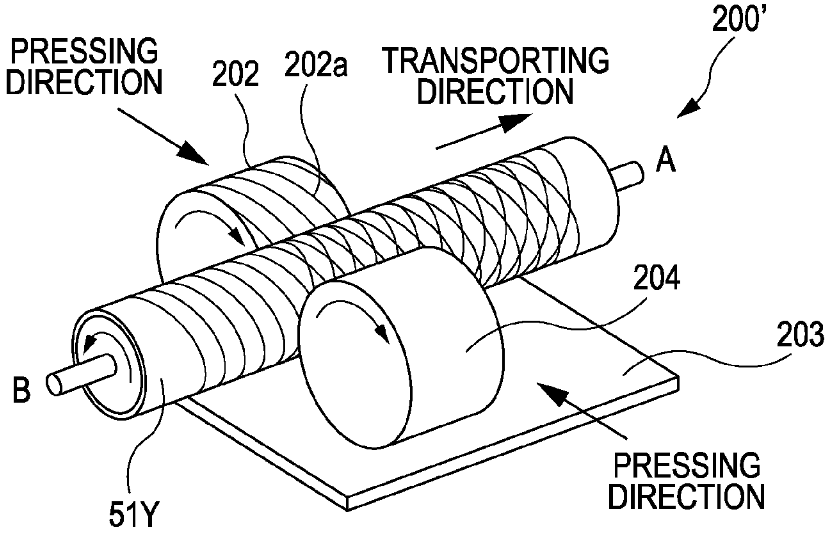

FIGS. 7A and 7B are diagrams showing the rolling working according to the first embodiment for forming the burrs 51*e* on the ridge lines of two sides of the quadrangle convex portion 51*c*, which face any one side of the axial direction of the developing roller 51Y.

The first rolling process in the first embodiment is performed by the rolling apparatus 200 in which the first die 201 having the first inclined blades 201*a* which are inclined with respect to the axial direction and the circumferential direction, and a non-bladed die 204 are disposed to face each other on the guide board 203. In this embodiment, the inclined angle of the first inclined blade 201*a* with respect to the axial direction is set to be 45° and the distance between the grooves formed in the developing roller 51Y is set to be an equal pitch. In the first rolling process, both the first die 201 and the non-bladed die 204 are rotated in the counter-clockwise direction, as indicated by an arrow in FIG. 7A. The unprocessed developing roller 51Y is transported between the first die 201 and the non-bladed die 204 on the guide board 203 from the end A side of the opposite ends A and B, while being rotated in the clockwise direction opposite to the rotation direction of the first die 201 and the non-bladed die 204. In this rolling working, the first die 201 and the non-bladed die 204 impart the working pressure of the direction which presses the unprocessed developing roller 51Y.

Figure 8:
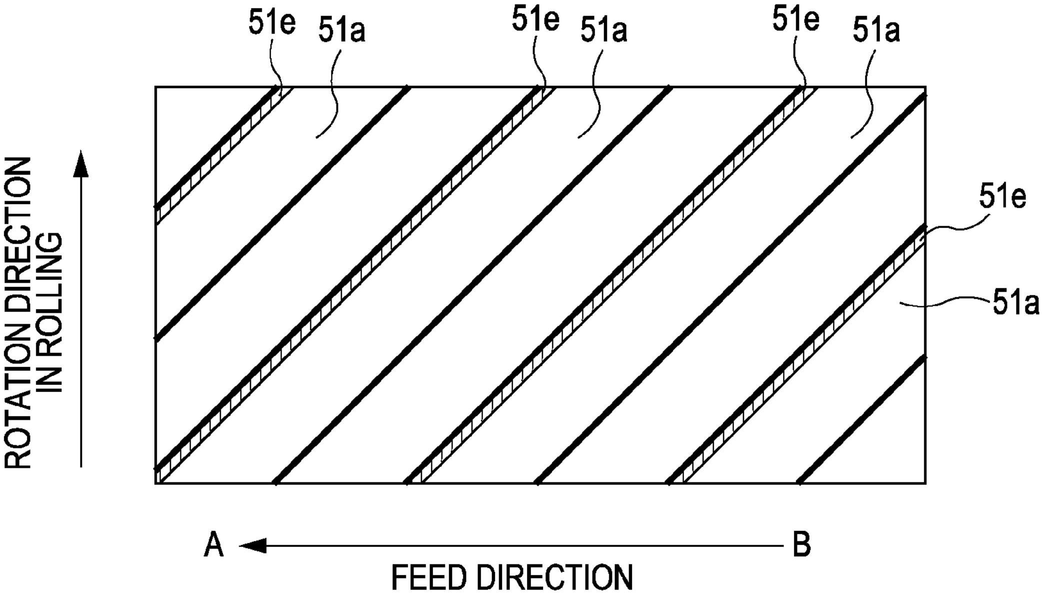
FIG. 8 is a diagram illustrating a first inclined groove and the state of a burr formed in a first rolling process.

As the result of the first rolling process, the first inclined groove 51*a* which is continuous in a helical shape, as shown in FIG. 8, is formed in the developing roller 51Y. In the rolling formation of the first inclined groove 51*a*, the burrs 51*e* are formed on the ridge lines on the upstream side of the rotation direction of the band shape portion, which has not been worked by rolling, of the developing roller 51Y, and the ridge lines on the upstream side of the feed direction of the unprocessed developing roller 51Y (the rear side of the feed direction, namely, the side facing one side of the axial direction of the developing roller 51Y).

The second rolling process in the first embodiment uses a rolling apparatus 200' different from the rolling apparatus 200 used in the first rolling process. The rolling apparatus 200' has a configuration in which the second die 202 having the second inclined blades 202*a* inclined with respect to the axial direction and the circumferential direction in the direction opposite to that of the first inclined blade 201*a*, and the non-bladed die 204 are disposed to face each other on the guide board 203. In this embodiment, the inclined angle of the second inclined blade 202*a* with respect to the axial direction is set to be 45° and the distance between the grooves formed in the developing roller 51Y is set to be an equal pitch.

In the second rolling process, the second die 202 and the non-bladed die 204 are rotated in the clockwise direction opposite to that in the first rolling process, as indicated by an arrow in FIG. 7B. The developing roller 51Y, in which the first inclined groove 51*a* has been formed, is transported between the second die 202 and the non-bladed die 204 on the guide board 203 from the end A of the opposite ends A and B, while being rotated in the counter-clockwise direction opposite to the rotation direction of the second die 202 and the non-bladed die 204, in the rolling apparatus 200'. In this rolling working, the second die 202 and the non-bladed die 204 impart the working pressure of the direction which presses the developing roller 51Y.

Figure 9:
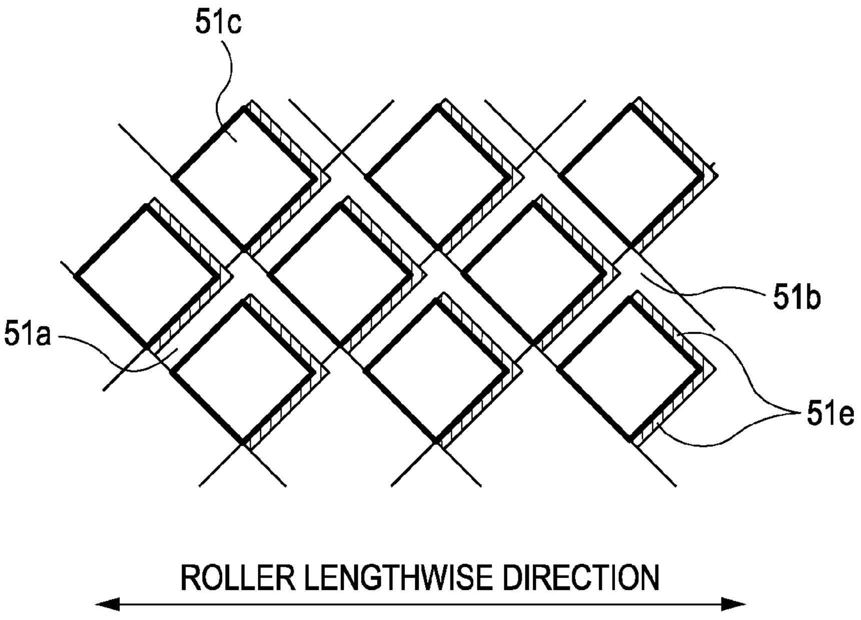
FIG. 9 is a diagram illustrating a second inclined groove and the state of a burr formed by a second rolling process.

As the result of the second rolling process, the second inclined groove 51*b* which intersects with the first inclined groove 51*a* that is continuous in a helical shape, at the angle of 90°, as shown in FIG. 9, is formed in the developing roller 51Y. The burrs 51*e* are formed on the ridge lines of two sides which face one side (right side) of the axial direction of the developing roller 51Y, of the square convex portion 51*c* surrounded by the first inclined groove 51*a* and the second inclined groove 51*b*.

In a case where the ridge lines of two sides of the convex portion 51*c*, on which the burr 51*e* is formed, are set to be the ridge lines on the other side (left side) of the axial direction of the developing roller 51Y, in the first rolling process, the rotation direction of the first die 201 and the non-bladed die 204 and the rotation direction of the unprocessed developing roller 51Y are set to be the directions opposite to those in FIG. 7A, thereby forming the first inclined groove 51*a*, and then in the second rolling process, the rotation direction of the second die 202 and the non-bladed die 204 and the rotation direction of the developing roller 51Y, on which the first inclined groove 51*a* has been formed, are set to be the directions opposite to those in FIG. 7B, thereby forming the second inclined groove 51*b*. As a result, the burrs 51*e* are formed on the ridge lines of two sides which face the other side (left side) of the axial direction of the developing roller 51Y, of the square convex portion 51*c* surrounded by the first inclined groove 51*a* and the second inclined groove 51*b*.

In the first embodiment, two rolling apparatuses 200 and 200' are used. However, the rolling apparatus 200 which has been used in the first rolling process may also be used in the second rolling process by replacing the first die 201 with the second die 202. Also, in the first embodiment, the intersecting angle of the first inclined groove 51*a* and the second inclined groove 51*b* is set to be 90°. However, the intersecting angle may also be another angle.

Figure 10A:
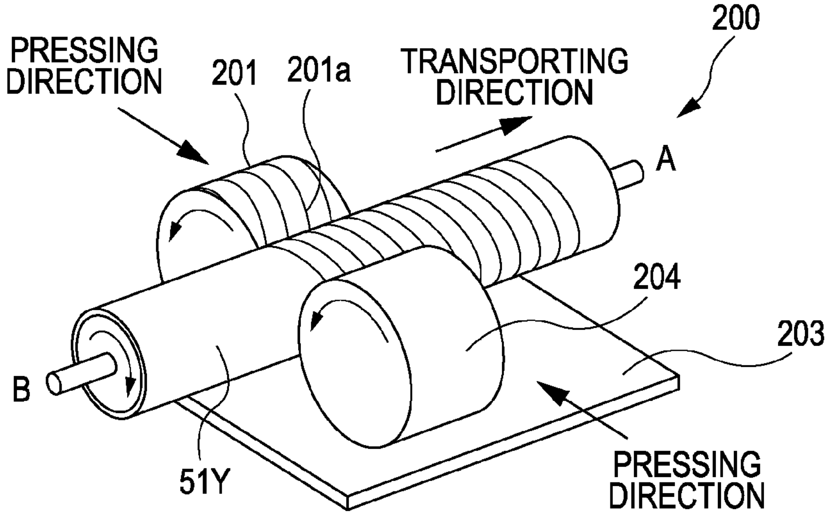
FIGS. 10A and 10B are diagrams illustrating the rolling working process of the developing roller according to a second embodiment of the invention.
Figure 10B:
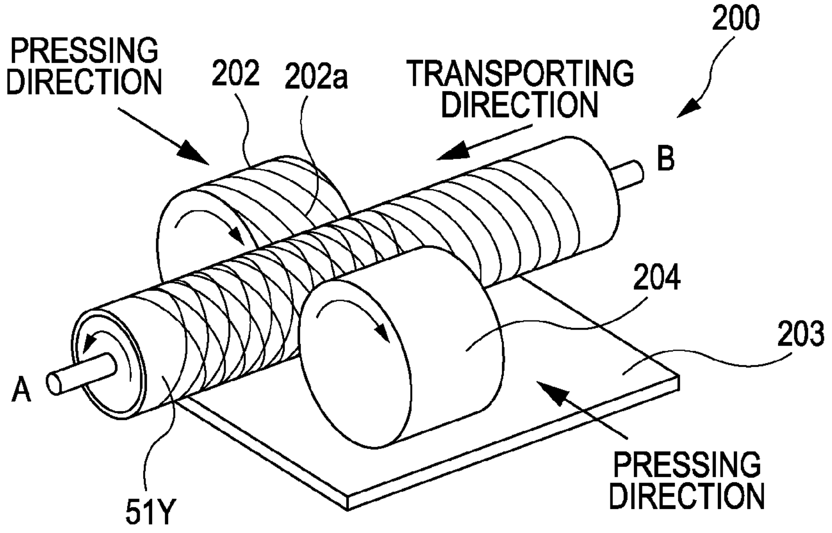

FIGS. 10A and 10B are diagrams showing the rolling working according to the second embodiment for forming the burrs 51*e* on the ridge lines of two sides facing any one side of the axial direction of the developing roller 51Y.

The first rolling process in the second embodiment is performed by the rolling apparatus 200 in which the first die 201 having the first inclined blades 201*a* and the non-bladed die 204 are disposed to face each other on the guide board 203. In this embodiment, the inclined angle of the first inclined blade 201*a* with respect to the axial direction is set to be 45° and the distance between the grooves formed in the developing roller 51Y is set to be an equal pitch. In the first rolling process, the first die 201 and the non-bladed die 204 are rotated in the counter-clockwise direction, as indicated by an arrow in FIG. 10A. The unprocessed developing roller 51Y is transported between the first die 201 and the non-bladed die 204 on the guide board 203 with the end A side of the opposite ends A and B at the head from one side of the rolling apparatus 200, while being rotated in the clockwise direction opposite to the rotation direction of the first die 201 and the non-bladed die 204. In this rolling working, the first die 201 and the non-bladed die 204 impart the working pressure of the direction which presses the unprocessed developing roller 51Y.

As the result of the first rolling process, similarly to the first embodiment, the first inclined groove 51*a* which is continuous in a helical shape, as shown in FIG. 8, is formed in the developing roller 51Y. In the rolling formation of the first inclined groove 51*a*, the burrs 51*e* are formed on the ridge lines on the upstream side of the rotation direction of the band shape portion, which has not been worked by rolling, of the developing roller 51Y, and the ridge lines on the upstream side of the feed direction of the unprocessed developing roller 51Y (the rear side of the feed direction, namely, the side facing one side of the axial direction of the developing roller 51Y).

The second rolling process in the second embodiment uses the rolling apparatus 200 in which the first die 201 of the rolling apparatus 200 used in the first rolling process has been replaced with the second die 202 having the second inclined blades 202*a* which are inclined in the direction opposite to that of the first inclined blade 201*a*. In this embodiment, the inclined angle of the second inclined blade 202*a* with respect to the axial direction is set to be 45° and the distance between the grooves formed in the developing roller 51Y is set to be an equal pitch. In the second rolling process, both the second die 202 and the non-bladed die 204 are rotated in the clockwise direction opposite to that in the first rolling process, as indicated by an arrow in FIG. 10B. The developing roller 51Y, in which the first inclined groove 51*a* has been formed, is transported with the end A of the opposite ends A and B at the head from the side opposite to one side of the rolling apparatus 200 in which the rolling working of the unprocessed developing roller 51Y has been started in the first rolling process. At this time, the developing roller 51Y is rotated in the counter-clockwise direction opposite to the rotation direction of the second die 202 and the non-bladed die 204. In this rolling working, the second die 202 and the non-bladed die 204 impart the working pressure of the direction which presses the developing roller 51Y.

As the result of the second rolling process, the second inclined groove 51*b* which intersects with the first inclined groove 51*a* that is continuous in a helical shape, at the angle of 90°, as shown in FIG. 9, is formed in the developing roller 51Y. The burrs 51*e* are formed on the ridge lines of two sides which face one side (right side) of the axial direction of the developing roller 51Y, of the square convex portion 51*c* surrounded by the first inclined groove 51*a* and the second inclined groove 51*b*. In the second embodiment, the intersecting angle of the first inclined groove 51*a* and the second inclined groove 51*b* is set to be 90°. However, the intersecting angle may also be another angle. Also in the second embodiment, similarly to the first embodiment, the ridge lines of two sides of the convex portion 51*c*, on which the burr 51*e* is formed, may also be set on the other side (left side) of the axial direction of the developing roller 51Y. The developing roller manufacturing method according to the second embodiment is suitable for a case where there is limitation on the length of the rolling working line, because single rolling apparatus 200 can be used.

Figure 11:
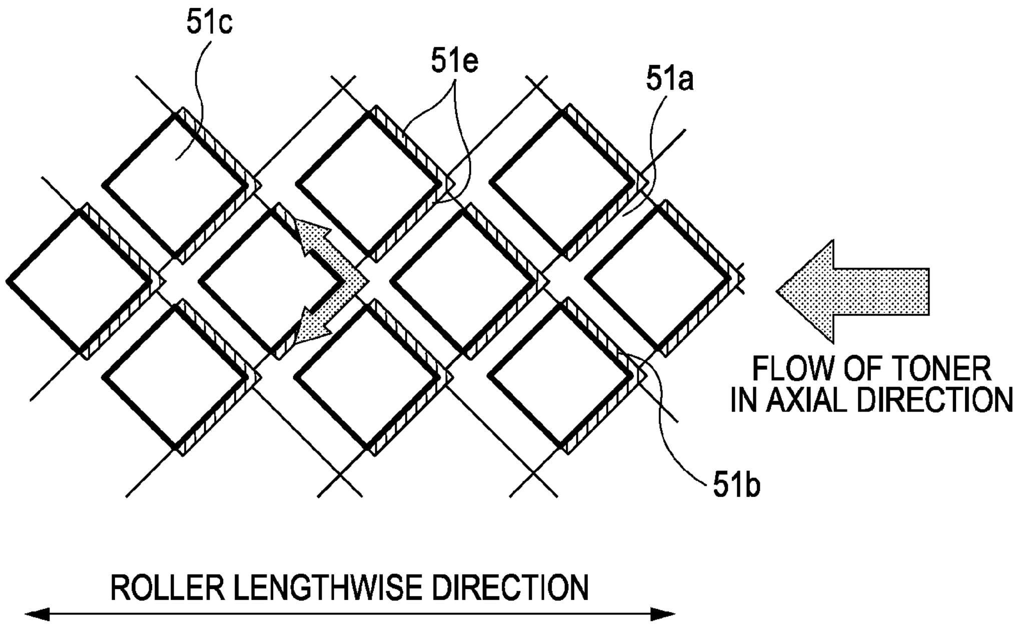
FIG. 11 is a diagram illustrating an operation and an effect which both result from the formation of the burrs on the ridge lines of two sides facing any one side of the axial direction of the developing roller.

FIG. 11 is a diagram showing an operation and an effect which both result from the formation of the burrs 51*e* on the ridge lines of two sides facing any one side of the axial direction of the developing roller 51Y. As shown in FIG. 11, the burrs 51*e* are formed on the ridge lines of two sides facing one side (right side) of the axial direction of the developing roller 51Y. In the case where the flow of toner, which advances from one side (right side) to the other side (left side), as indicated by an arrow, is formed on the developing roller 51Y, the flow of toner gets into under the ridge lines of two sides, on which the burrs 51*e* have been formed, and consequently, toner remaining on the inclined flanks 51*d* of the shades of the burrs 51*e* is swept away, so that the retention of toner is prevented. As a result, the occurrence of the colored filming due to the toner retention can be suppressed.

The entire disclosure of Japanese Patent Application No. 2008-315584, filed Dec. 11, 2008 is expressly incorporated by reference herein.

What is claimed is:

1. A method of manufacturing a developing roller, comprising:

a first rolling process for forming a first inclined groove which is continuous in a helical shape, by rotating a first die having blades inclined with respect to an axial direction and a circumferential direction, and a non-bladed die in the same direction, and feeding an unprocessed developing roller between the first die and the non-bladed die while rotating the developing roller in the direction opposite to the rotation direction of the first die and the non-bladed die and applying a working pressure to the developing roller; and a second rolling process for forming a second inclined groove which is continuous in a helical shape and intersects with the first inclined groove, by rotating a second die having blades inclined with respect to an axial direction and a circumferential direction in the direction opposite to that of the first die, and the non-bladed die in the same direction opposite to that in the first rolling process, and feeding the developing roller on which the first inclined groove has been formed, between the second die and the non-bladed die while rotating the developing roller in the direction opposite to that in the first rolling process and applying a working pressure to the developing roller, wherein burrs are formed on the ridge lines of two sides which face any one side of the axial direction of the developing roller, in a quadrangle convex portion surrounded by the first inclined groove and the second inclined groove.

2. The method according to claim 1, wherein a guide board is disposed below the first die or the second die and the non-bladed die.

3. The method according to claim 1, wherein the developing roller is made of metal.

4. The method according to claim 1, wherein the pitches of the first inclined groove and the second inclined groove are set to an equal pitch and the intersecting angle of the first inclined groove and the second inclined groove is set to be 90°.

5. A developing device comprising:

a supply roller which supplies toner;

a developing roller to which toner is supplied from the supply roller; and a regulating blade which comes into contact with the developing roller, thereby regulating the total thickness of toner on the developing roller, wherein the developing roller having a first inclined groove and a second inclined groove, which are continuous in a helical shape inclined with respect to an axial direction and a circumferential direction and intersect with each other, formed in the surface thereof, wherein burrs are formed on the ridge lines of two sides which face any one side of the axial direction of the developing roller, in a quadrangle convex portion surrounded by the first inclined groove and the second inclined groove.

6. The developing device according to claim 5, wherein toner is transported in the groove portions of the first inclined groove and the second inclined groove.

7. The developing device according to claim 5, wherein the developing roller is made of metal.

8. An image forming apparatus comprising:

a latent image supporting body on which an electrostatic latent image is formed;

a developing device which develops a toner image on the latent image supporting body by developing the electrostatic latent image by using toner; and a transferring device which transfers the toner image on the latent image supporting body to a transfer medium, wherein the developing device is the developing device according to claim 5.

* * * * *